US012784742B2

(12) United States Patent
Wei et al.

(10) Patent No.: US 12,784,742 B2
(45) Date of Patent: Nov. 3, 2026

(54) IMPROVING DETECTION OF VOICE-BASED KEYWORDS USING FALSELY REJECTED DATA

(71) Applicant: QUALCOMM Incorporated, San Diego, CA (US)

(72) Inventors: Jun Wei, Shenzhen (CN); Xiaoxia Dong, Shenzhen (CN); Qimeng Pan, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 18/292,297

(22) PCT Filed: Sep. 26, 2021

(86) PCT No.: PCT/CN2021/120549
§ 371 (c)(1),
(2) Date: Jan. 25, 2024

(87) PCT Pub. No.: WO2023/044836
PCT Pub. Date: Mar. 30, 2023

(65) Prior Publication Data
US 2025/0095640 A1 Mar. 20, 2025

(51) Int. Cl.
*G10L 15/07* (2013.01)
*G10L 15/06* (2013.01)
(Continued)

(52) U.S. Cl.
CPC ............ *G10L 15/07* (2013.01); *G10L 15/063* (2013.01); *G10L 15/083* (2013.01); *G10L 15/30* (2013.01);
(Continued)

(58) Field of Classification Search
CPC ............. G10L 15/07; G10L 2015/0635; G10L 2015/0636; G10L 15/10; G10L 15/63;
(Continued)

(56) References Cited

U.S. PATENT DOCUMENTS 6,438,519 B1 * 8/2002 Campbell .......... G06F 18/2453 704/231
8,990,079 B1 * 3/2015 Newman ................ G10L 25/93 704/214
(Continued)

FOREIGN PATENT DOCUMENTS

WO 2016039847 A1 3/2016

OTHER PUBLICATIONS

International Search Report and Written Opinion—PCT/CN2021/120549—ISA/EPO—Mar. 18, 2022.

*Primary Examiner* — James S Wozniak
(74) *Attorney, Agent, or Firm* — Weaver Austin Villeneuve & Sampson LLP—QUALCOMM Incorporated

(57) ABSTRACT

Techniques described herein are directed to improving a user keyword detection model using user audio samples that have been falsely rejected. In some embodiments, user equipment (UE) may detect multiple attempts by a user at uttering a keyword. A true keyword that matches keyword models implemented by the UE may activate a desired function, such as initiating an assistant application, initiating a specific application, waking up from a lower power state, transitioning to a lower power state, toggling a power-saving mode, unlocking or locking the device, etc. Any true keywords uttered prior to detection of the true keyword but which have been falsely rejected may be sent to a server to train the keyword model and generate an updated keyword model. The updated keyword model may be received by the
(Continued)

UE to replace the keyword model being used, allowing the UE to continually improve keyword detection accuracy.

30 Claims, 8 Drawing Sheets

(51) Int. Cl.
*G10L 15/08* (2006.01)
*G10L 15/30* (2013.01)

(52) U.S. Cl.
CPC *G10L 2015/0635* (2013.01); *G10L 2015/088* (2013.01)

(58) Field of Classification Search
CPC . G10L 15/083; G10L 2015/088; G10L 15/30; G10L 15/063
USPC ...................................... 704/244, 251, 270.1
See application file for complete search history.

(56) References Cited

U.S. PATENT DOCUMENTS

| | | | | |
|---|---|---|---|---|
| 9,159,319 | B1 * | 10/2015 | Hoffmeister | G10L 15/08 |
| 9,589,560 | B1 * | 3/2017 | Vitaladevuni | G10L 15/01 |
| 10,872,599 | B1 * | 12/2020 | Wu | G10L 15/08 |
| 11,714,968 | B2 * | 8/2023 | Batra | G06N 5/045 704/9 |
| 2016/0077574 | A1 * | 3/2016 | Bansal | G06F 1/3293 704/275 |
| 2016/0077792 | A1 * | 3/2016 | Bansal | G06F 3/167 704/275 |
| 2018/0158453 | A1 * | 6/2018 | Campbell | G10L 15/22 |
| 2019/0371310 | A1 * | 12/2019 | Fox | G10L 15/26 |
| 2021/0050003 | A1 * | 2/2021 | Zaheer | G10L 15/16 |
| 2021/0304734 | A1 * | 9/2021 | Kang | G10L 15/063 |
| 2021/0390948 | A1 * | 12/2021 | Shah | G10L 15/08 |
| 2022/0165253 | A1 * | 5/2022 | Sharifi | G10L 15/065 |
| 2022/0189466 | A1 * | 6/2022 | Sharifi | G10L 15/16 |

* cited by examiner

IMPROVING DETECTION OF VOICE-BASED KEYWORDS USING FALSELY REJECTED DATA

RELATED APPLICATIONS

This application is a National Phase entry of International Application No. PCT/CN2021/120549, filed Sep. 26, 2021, entitled "IMPROVING DETECTION OF VOICE-BASED KEYWORDS USING FALSELY REJECTED DATA", which is assigned to the assignee hereof, and incorporated herein in its entirety by reference.

BACKGROUND

1. Field of Disclosure

The present disclosure relates generally to the field of user devices, and more specifically to audio and voice detection by a consumer device.

2. Description of Related Art

Voice-recognition technology has become more ubiquitous and used more frequently by consumers and users of capable devices as a replacement to manual or tactile control. Voice commands may be issued to mobile user devices, Internet of Things (IOT) devices, "smart home" devices, etc. As an example, users are able to quickly wake up a mobile device from sleep status or bring up an assistant application by uttering a phrase or a keyword (such as the name assigned to the assistant personality or the manufacturer of the device) while proximate to the device. This feature has become a convenience in everyday life of users.

BRIEF SUMMARY

Techniques directed to improving a user keyword detection model using user audio samples that have been falsely rejected are disclosed herein. In some embodiments, user equipment (UE) may detect multiple attempts by a user at uttering a keyword. A true keyword that matches keyword models implemented by the UE may activate a desired function, such as initiating an assistant application, initiating a specific application, waking up from a lower power state, transitioning to a lower power state, toggling a power-saving mode, unlocking or locking the device, etc. Any true keywords uttered prior to detection of the true keyword but which have been falsely rejected may be sent to a server to train the keyword model and generate an updated keyword model. The updated keyword model may be received by the UE to replace the keyword model being used, allowing the UE to continually improve keyword detection accuracy.

In one aspect of the present disclosure, a method of updating a user audio detection model on a user equipment is disclosed. In some embodiments, the method includes: implementing the user audio detection model, the user audio detection model configured to change an operational state of the user equipment based on true keyword samples detected; detecting audio from a user; detecting, using the user audio detection model, presence of a true keyword sample in the audio from the user; responsive to the detecting of the audio from the user, obtaining a plurality of user audio data preceding the true keyword sample, the plurality of user audio data comprising one or more falsely rejected true keyword samples, the one or more falsely rejected true keyword samples being insufficient to change the operational state of the user equipment; transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and receiving the updated user audio detection model from the networked entity, or locally generating the updated user audio detection model using the at least portion of the one or more falsely rejected true keyword samples.

In another aspect of the present disclosure, user equipment capable of improving a user audio detection model is disclosed. In some embodiments, the user equipment includes: a memory; and a processor, coupled to the memory, and operably configured to: implement the user audio detection model, the user audio detection model configured to change an operational state of the user equipment based on true keyword samples detected; detect audio from a user; detect, using the user audio detection model, presence of a true keyword sample in the audio from the user; responsive to the detecting of the audio from the user, obtain a plurality of user audio data preceding the true keyword sample, the plurality of user audio data comprising one or more falsely rejected true keyword samples, the one or more falsely rejected true keyword samples being insufficient to change the operational state of the user equipment; transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

In some embodiments, the user equipment includes: means for implementing an user audio detection model, the user audio detection model configured to change an operational state of the user equipment based on true keyword samples detected; means for detecting audio from a user; means for detecting, using the user audio detection model, presence of a true keyword sample in the audio from the user; means for, responsive to the detecting of the audio from the user, obtaining a plurality of user audio data preceding the true keyword sample, the plurality of user audio data comprising one or more falsely rejected true keyword samples, the one or more falsely rejected true keyword samples being insufficient to change the operational state of the user equipment; means for transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and means for receiving the updated user audio detection model from the networked entity, or locally generating the updated user audio detection model using the at least portion of the one or more falsely rejected true keyword samples.

In another aspect of the present disclosure, a non-transitory computer-readable apparatus is disclosed. In some embodiments, the storage medium includes a plurality of instructions configured to, when executed by one or more processors, cause user equipment to: implement a user audio detection model, the user audio detection model configured to change an operational state of the user equipment based on true keyword samples detected; detect audio from a user; detect, using the user audio detection model, presence of a true keyword sample in the audio from the user; responsive to the detecting of the audio from the user, obtain a plurality of user audio data preceding the true keyword sample, the plurality of user audio data comprising one or more falsely rejected true keyword samples, the one or more falsely rejected true keyword samples being insufficient to change the operational state of the user equipment; transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

BRIEF DESCRIPTION OF THE DRAWINGS

Like reference symbols in the various drawings indicate like elements, in accordance with certain example implementations.

DETAILED DESCRIPTION

While voice recognition may become more accurate through training of a user device with the user's voice, a sufficient number of training samples is one of the most important factors in training or generating a keyword detection model. It is difficult to collect sufficient training samples of users which have unique voiceprint characteristics (e.g., tone, pitch, timbre, speed, accent, other spectrographic patterns). Most manufacturers of voice-enabled devices often require a user to utter the correct keyword several times to identify the user's voiceprint and train a keyword detection model before being able to use the associated features (e.g., waking up the device, activating the assistant). These samples are often lacking for a good performance, i.e., accurate detection of keywords. Moreover, this trained keyword detection model is fixed after training, so it cannot be continuously or incrementally improved. Rather, the model must be wholly discarded and retrained. Retraining still uses a limited quantity of voice samples, creating the same limitation as before.

Aspects of the present disclosure describe a mechanism for automatically collecting keyword audio data from the user as the user naturally utters them, and identifying utterances that are rejected by the detection model. Particularly, falsely rejected keyword audio data may be used to improve the keyword detection model. The falsely rejected keyword audio data may be used as training samples as supplement to an existing keyword detection model, which allows the model to be continuously improved for better performance with a higher detection accuracy and detection rate.

While the term "keyword" is used to refer in the description in its singular form, it will be appreciated that the same techniques described herein may be applied to single-word utterances and multiple-word utterances. An instance of such a multiple-word utterance (commonly and colloquially referred to as a "phrase") may also be referred to as a "keyword." In contrast, "keywords" in the plural sense may refer to multiple instances of at least one keyword, whether the same keyword or different keywords. For example, first, second, and third keywords (as discussed with respect to FIGS. 2 and 3 below) may be three separate instances of and/or attempts at uttering the same keyword. Moreover, a "keyword sample" may specifically refer to audio data (including voice data) associated with a keyword.

Figure 1:
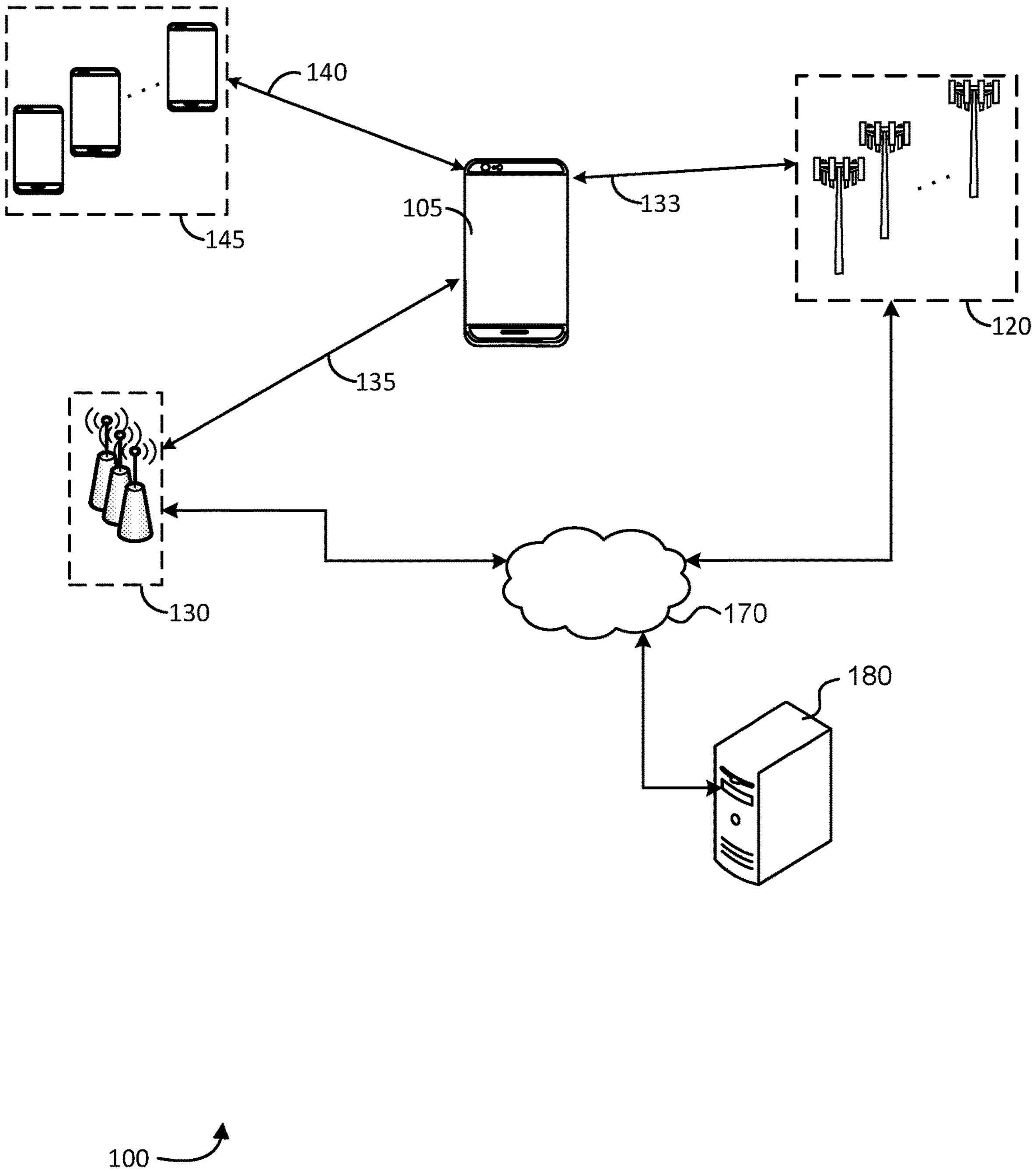
FIG. 1 is a diagram of a communications system, according to an embodiment.

FIG. 1 is a simplified illustration of a communications system 100 in which a UE 105, external client 180 and/or other components of the communications system 100 can use the techniques provided herein for improving a user keyword detection model, according to an embodiment. The techniques described herein may be implemented by one or more components of the communications system 100. The communications system 100 can include: a UE 105, base station(s) 120, access point(s) (APs) 130, a network 170, and an external client 180. Generally put, the communications system 100 can enable data communication between any of these elements and any other one of the elements, e.g., between a UE 105 and an external client 180 via the network 170 based on RF signals received by and/or sent from the UE 105 and other components (e.g., base stations 120, APs 130) transmitting and/or receiving the RF signals.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the communications system 100 may include a larger or smaller number of base stations 120 and/or APs 130 than illustrated in FIG. 1. The illustrated connections that connect the various components in the communications system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to the UE 105 or one or more other UEs 145. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as the external client 180, by accessing the network 170 via a base station 120 using a first communication link 133. Additionally or alternatively, because APs 130 also may be communicatively coupled with the network 170, UE 105 may communicate with network-connected and Internet-connected devices, including the external client 180, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs, e.g., with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The external client 180 may be a web server or remote application that may have some association with UE 105 (e.g. may be accessed by a user of UE 105) or may be a server, application, or computer system providing a data service to some other user or users. The web server may include data storage media or modules. Such data storage modules may store profile data or user data associated with the UE 105 or user(s) of the UE 105.

Detection of Falsely Rejected Keywords

Figure 2:
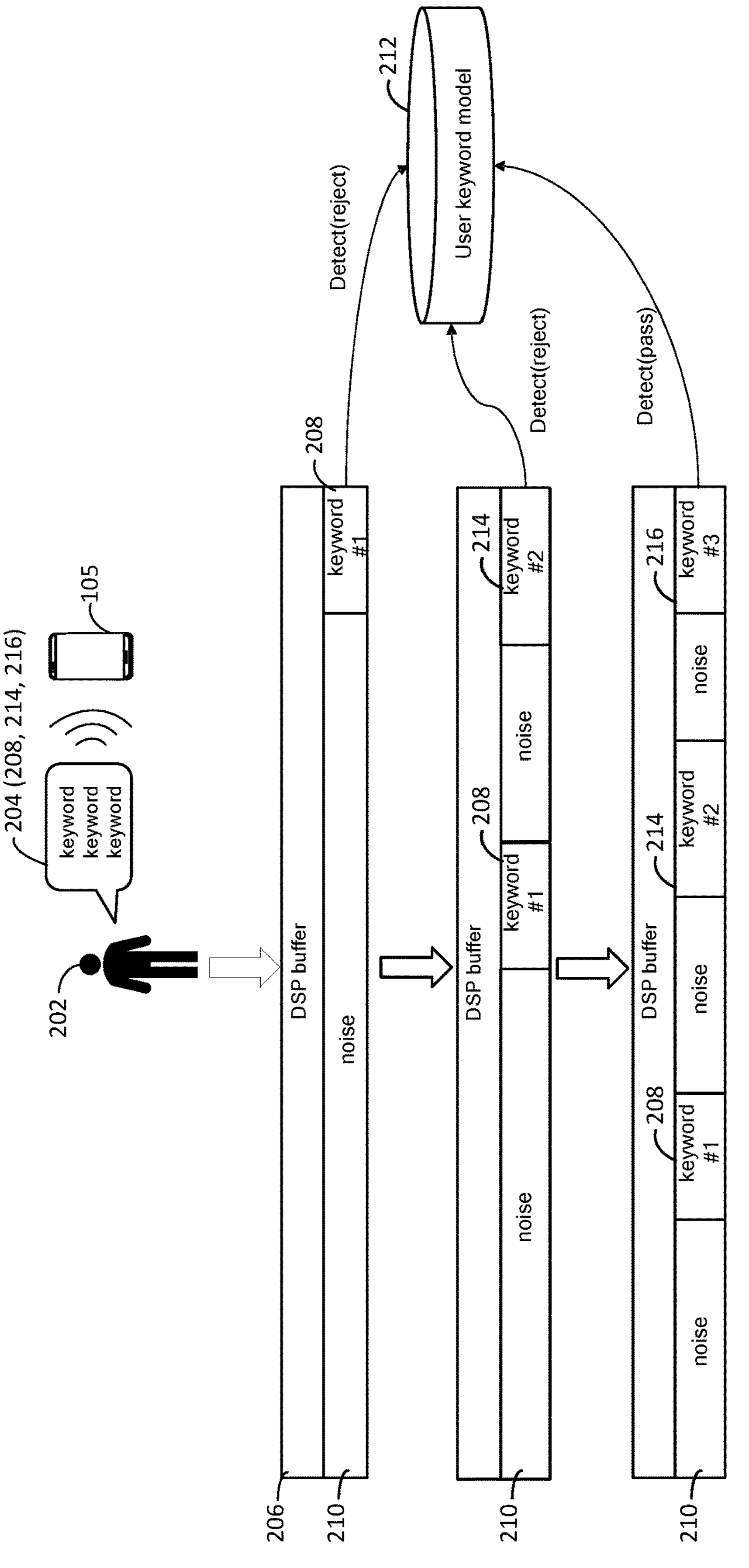
FIG. 2 is a block diagram illustrating one use scenario in which a keyword is detected as a true keyword sample, rejected as a falsely rejected true keyword sample, and rejected as a false keyword sample at different points in time.

FIG. 2 is a block diagram illustrating one use scenario in which a keyword is detected as a true keyword sample, rejected as a falsely rejected true keyword sample, and rejected as a false keyword sample at different points in time.

A "true keyword sample" in this context may refer to audio or voice data having characteristics (e.g., spectrographic characteristics) that correspond to a user keyword model (trained with a user of a UE) and/or one or more stored keyword audio data. Detection of a true keyword sample may activate one or more functions of a UE (initiate an assistant application, initiate a specific application, wake up from a lower power state, transition to a lower power state, toggle a power-saving mode, unlock or lock the device, etc.). In some embodiments, multiple keywords may activate corresponding desired functionalities. Keywords and functions may not necessarily have a one-to-one relationship; i.e., a given function may be initiated or activated by more than one keyword. In some cases, the UE may not detect the uttered keyword as a true keyword if the UE is unable to differentiate the keyword from background noise, or if it does not recognize the utterance as a keyword because of a mismatch with a user keyword model.

A "falsely rejected true keyword sample" in this context may refer to audio or voice data having some characteristics that correspond to a user keyword model and/or one or more stored keyword audio data, but not activating any function of the UE upon detection. Examples of falsely rejected true keyword samples may include a keyword utterance by a user who has not been associated (e.g., registered or trained) with the UE, a keyword that has been uttered from a distance too far to pick up with sufficient fidelity, clarity, or volume, or a keyword that has been uttered with background noise that obfuscates the audio.

A "false keyword sample" in this context may refer to audio or voice data not having any characteristics that correspond to a user keyword model or any stored keyword audio data. A false keyword sample may be a keyword uttered by a different user other than the user associated with the UE, a different word that sounds similar to the keyword, a keyword pronounced improperly by the user, background conversation, etc. Many utterances made by a user proximate to a UE or audio detected by the UE would fall under this category.

Referring to FIG. 2, a user 202 may attempt to utter a keyword 204 one or more times such that a UE 105 may detect the presence of an uttered keyword via, e.g., a microphone integrated therewith or connected thereto. Such a microphone may detect audio and cause recordation of audio data, including that corresponding to keyword samples along with background noise.

In some embodiments, the UE 105 may maintain a digital signal processing (DSP) buffer 206. The DSP buffer 206 may be configured to continuously record audio data detected by the microphone of the UE 105. The length of the DSP buffer 206 may be set to a prescribed length of time, e.g., the last 10 seconds. In some implementations, recordings prior to the prescribed length of time may be discarded. In some implementations, prior recording beyond the prescribed length of time may be stored for later analysis or training.

In some embodiments, the DSP buffer may be maintained for a dynamically determined length of time. For example, the length of time may change from 10 seconds to 30 seconds depending on factors such as the characteristics of received audio, e.g., too much background noise causing demand for additional user audio keyword samples, or too many detected keyword samples registering as false keyword samples and causing demand for additional keyword samples. As another example, the length of time may decrease temporarily, or until another condition is met, from 10 seconds to 5 seconds if the UE 105 is performing other actions that require a large amount of memory or processing power.

In some embodiments, the DSP buffer 206 may switch to a non-continuous mode, where the buffer is or becomes active or inactive when certain criteria are met. For example, if the UE 105 is in low battery mode, the DSP buffer 206 may become inactive or periodically active so as to reduce and conserve power and prioritize other functions of the UE. As another example, the DSP buffer 206 may become active when the UE 105 enters a low-power state (e.g., sleep mode), as this lower-power state increases the likelihood that a user will attempt to wake up the UE 105, enabling the UE 105 to collect keyword samples from the user. As another example, the DSP buffer 206 may become inactive if the UE 105 is performing other actions that require a large amount of memory or processing power, so as to divert resources to higher-priority actions. As another example, the DSP buffer 206 may become inactive based on the time of day (e.g., become inactive between 2 AM and 6 AM or other times when the UE is unlikely to be used), device activity (e.g., become inactive when no user input has been registered or no user usage has been detected for a period of time), audio activity (e.g., become inactive or intermittently active (e.g., 10 minutes on, 10 minute off) when no sound has been detected for the past 30 minutes), and/or other indicators of usage.

In some embodiments, the UE may utilize a user keyword model 212 for determining whether the uttered keyword sample is a true keyword (which would cause performance a desired UE functionality) or not. In some embodiments, the user keyword model 212 may be stored and operative on the UE. In other embodiments, the user keyword model 212 may be stored in a storage external to the UE, e.g., on a networked storage medium, on a server, or other accessible storage medium. The user keyword model 212 may be a learning model previously trained (using at least, e.g., forward propagation and backpropagation) utilizing any suitable supervised, unsupervised, semi-supervised, and/or reinforced learning algorithms in conjunction with initially collected audio data samples (input during, e.g., setup of a voice-recognition feature of the UE 105) and stored in memory of the UE 105. The user keyword model 212 may based on a neural network (NN). Algorithms applied to the user keyword model 212 may include classification algorithms such as logistic regression, support vector machine (SVM), Naive Bayes, nearest neighbor (e.g., k-nearest neighbor (K-NN)), random forest, Gaussian Mixture Model (GMM), etc. At least a portion of the learning algorithm may also include non-classification algorithms such as linear regression.

In some embodiments, the user keyword model 212 may be continued to be trained at least with falsely rejected keywords. The user keyword model 212 may be updated externally to the UE (e.g., on a web server 180) based on additional audio data samples collected from the user 202, e.g., falsely rejected true keyword samples.

Referring again to FIG. 2, the user 202 may utter three instances of the keyword 204 in an attempt to wake up the UE 105 from a low-power state or to activate an application (e.g., an assistant application), although desired functionalities activated by the user's utterance(s) are not limited to such actions.

The UE 105 may detect the audio associated with the first user utterance, and collect the detected voice data on the DSP buffer 206 as a first keyword 208. The DSP buffer 206 shown in FIG. 2 may have collected prior audio samples including background noise 210 and/or periods of silence. The first keyword 208 may be recognized as a keyword by the user keyword model 212 but may not be recognized as a true utterance of the keyword to activate the desired function (e.g., wake up the device, activate the assistant). In other words, the first keyword 208 may be a falsely rejected true keyword sample or a false keyword sample. At this point, it is not yet known whether the keyword has been falsely rejected as a true keyword or is actually a false keyword.

In some embodiments, the sufficiency of whether a keyword is recognized as a true keyword may depend on factors such as the voice profile of the user (tone, pitch, timbre, speed, accent, spectrographic characteristics, etc.) and/or based on a similarity of the detected audio data to the user keyword model 212 that has been trained for use by the UE 105. The user keyword model 212 may enable detection of whether at least a partial match exists between a collected audio data sample (e.g., a keyword sample) and stored keyword audio data, i.e., whether there is a sufficient match between the keyword sample and audio data associated with a true keyword.

In some embodiments, the similarity between the detected audio data and the user keyword model 212 may be determined based on one or more thresholds. In some embodiments, the presence of a falsely rejected true keyword sample may be determined based on a first similarity threshold associated with the user keyword model being met or exceeded but not meeting or exceeding a second similarity threshold. In other words, a falsely rejected true keyword sample may be similar to the true keyword and potentially useful as a sample for further training the user keyword model, but it may not be considered to be "similar enough" to a sample that may be regarded as a true keyword sample. A true keyword sample may meet or exceed the second similarity threshold.

Further, the presence of a false keyword sample (as opposed to a falsely rejected true keyword) may be determined based on the first similarity threshold not being met nor exceeded. Such false keyword samples may not be useful for training the user keyword model and may be discarded in many cases.

In some embodiments, the only distinction made by the user keyword model 212 may be whether the detected audio data is a true keyword sample or not. For instance, one threshold may distinguish between (i) true keyword samples and (ii) falsely rejected true keyword samples or false keyword samples. As will be discussed with respect to FIG. 3, a simple keyword model 316 may distinguish between falsely rejected true keyword samples and false keyword samples.

In some embodiments, the sufficiency of whether a keyword is recognized as a true keyword may be based on a different (second) user keyword model (not shown). Such a user keyword model may have different or fewer detection criteria as compared to other user keyword models, e.g., the user keyword model 212. For example, in some implementations, a second user keyword model may compare the audio characteristics of the keyword itself (e.g., locations of spectral peaks) but not account for whose voice was spoken with, or which user uttered the keyword. In some implementations, the second user keyword model (or another user keyword model) may determine the likelihood that a word or phoneme is present in the keyword based on mel-frequency cepstral coefficients (MFCCs) representing the audio. That is, pitch, tone, timbre, and other voiceprint characteristics may be ignored when using the second user keyword model with different or fewer detection criteria. Including fewer or additional detection criteria may decrease or increase the strictness of the comparison depending on the use case. In all cases, falsely rejected keyword true keyword samples may be used as training data at least for the second user keyword model.

Referring back to FIG. 2, if the audio data associated with the first keyword 208 does not produce the desired result (e.g., wake up, activate assistant) to the user 202, the user 202 may try again after a short time interval, with a second utterance. As shown in FIG. 2, the UE 105 may detect and collect the detected voice data for the second utterance on the DSP buffer 206 as a second keyword 214. Again, the second keyword 214 may be recognized as a keyword but may not be recognized as a true utterance of the keyword to activate the desired function, i.e., another falsely rejected true keyword sample or a false keyword sample.

When the UE does not respond as expected with the desired functionality, the user may yet again attempt a third time with a third utterance. The UE 105 may detect and collect the detected voice data for the third utterance on the DSP buffer 206 as a third keyword 216. The third keyword 216 may be recognized as a true keyword by the user keyword model 212, activating the desired functionality (e.g., wake up, activate assistant).

In this scenario, DSP buffer 206 will have captured three keyword utterances as keywords 208, 214 and 216, along with background noise 210 adjacent to the keywords, within a prescribed length of time (e.g., 10 seconds). Activation of the desired functionality by keyword 216 may indicate to the UE 105 that audio data corresponding to the prior keywords 208, 214 that is captured in the DSP buffer 206 may be useful training data for updating the user keyword model 212. To emphasize, true keywords that are falsely rejected may be used to improve the detection accuracy on an ongoing basis, rather than forcing the user to adapt to or endure the inaccuracies of the initial training.

Figure 3:
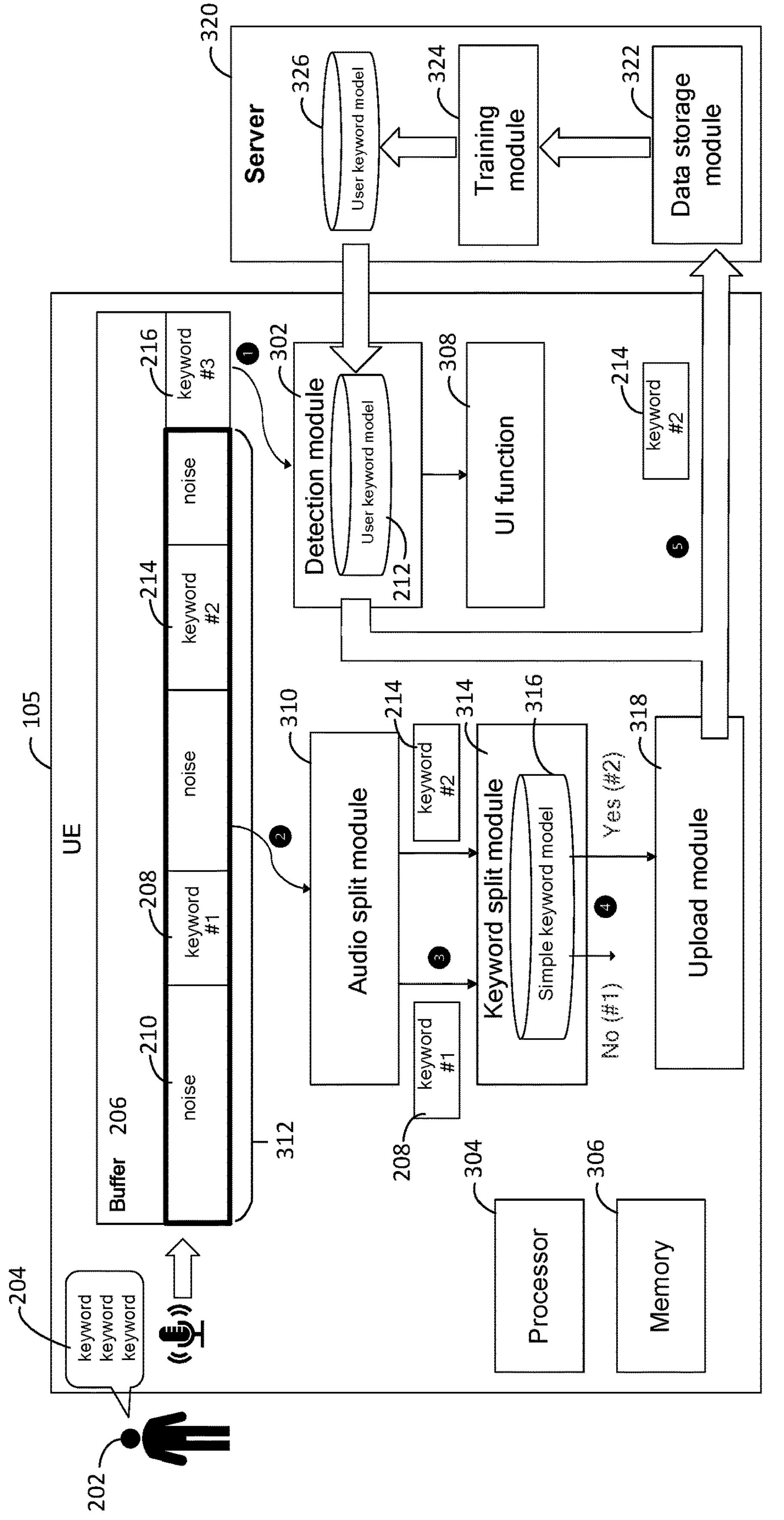
FIG. 3 is a block diagram illustrating a system configured to implement a mechanism in which a user keyword model is updated based on detection of falsely rejected true keyword samples by a user equipment (UE).

FIG. 3 is a block diagram illustrating a system configured to implement a mechanism in which a user keyword model is updated based on detection of falsely rejected true keyword samples by a UE (e.g., UE 105). In some embodiments, a user 202 may attempt to utter a keyword 204 one or more times such that a UE 105 may detect the presence of an uttered keyword via, e.g., a microphone integrated therewith or connected thereto, as discussed with respect to FIG. 2. A DSP buffer 206 may be maintained in the UE 105 and record voice data corresponding to utterances of three keywords 208, 214 and 216, along with background noise 210, for a prescribed length of time (e.g., 10 seconds), as discussed with respect to FIG. 2.

In some embodiments, the UE 105 may include a detection module 302. The detection module 302 may include hardware and/or software components configured to detect and/or recognize audio data and compare the audio data with an existing user keyword model 212. The detection module 302 may include data interfaces configured to receive the audio data. The detection module 302 may include or be associated with computer-readable instructions configured to be executed by one or more processor apparatus 304 to perform the above functions. In some implementations, the detection module 302 may include its own processor(s) to execute instructions. One or more memory 306 coupled to the processor apparatus 304 may also include instructions configured to be executed by a processor 304 for various ones of the modules disclosed herein.

Audio data associated with each potential keyword (e.g., 208, 214, 216) may be transmitted to the detection module 302. For instance, audio data associated with the first keyword 208 may be evaluated by the detection module 302 for a match with the user keyword model 212. The user keyword model 212 may have been previously initiated and trained, as noted above. Audio for the first keyword 208 may be determined by the detection module 302 to not be a true keyword sample. Subsequently detected audio for the second keyword 214 may also be determined by the detection module 302 to not be a true keyword sample. Subsequently detected audio for the third keyword 216 may be regarded as a true keyword sample based on a sufficient match determined by, e.g., comparison with respect to first and second similarity thresholds associated with the user keyword model 212 as described above.

Based on the detection of the true keyword, the detection module 212 may cause activation of a user interface 308. In some implementations, the user interface (UI) 308 may be an assistant application that is capable of at least voice activation and voice-based assistance (requesting a user command by audio, reciting news, asking for appointment details, etc.). In some implementations, the UI 308 may include a wake-up or an unlock procedure that causes a screen associated with the UE 105 to turn on. Myriad other functionalities may be activated based on the detection of the true keyword.

In some embodiments, the UE 105 may include an audio split module 310. The audio split module 310 may include hardware and/or software components configured to (i) receive, from the DSP buffer 206, audio data 312 in the DSP buffer 206 which precedes the detected true keyword 216, (ii) filter out background noise 210 and/or period of silence, and (iii) split and isolate any remaining portion of the audio data 312 into one or more keywords (e.g., 208 and/or 214). The detection module 302 may include data interfaces configured to receive and transmit the audio data, an audio filter circuit and/or an audio splitter. The audio split module 310 may include or be associated with computer-readable instructions configured to be executed by one or more processor apparatus 304 to perform the above functions. In some implementations, the audio split module 310 may include its own processor(s) to execute instructions.

In some embodiments, the UE 105 may include a keyword split module 314. The keyword split module 314 may include hardware and/or software components configured to receive audio data corresponding to other true (but falsely rejected) and/or non-true (false) keywords (e.g., 208 and/or 214) and verify whether the received audio data contains a true keyword. At this point, it is not yet determined whether the audio data contains any actually false keyword samples or falsely rejected true keyword samples, but the foregoing keyword samples are labeled as such to identify them in the present discussion. The keyword split module 314 may include data interfaces configured to receive and transmit the audio data. The keyword split module 314 may include or be associated with computer-readable instructions configured to be executed by one or more processor apparatus 304 to perform the above functions. In some implementations, the keyword split module 314 may include its own processor(s) to execute instructions.

The keyword split module 314 may include a simple keyword model 316. In some embodiments, the simple keyword model 316 may be configured to detect and compare keywords but does not account for the user. That is, the simple keyword model 316 may compare the audio characteristics of the keyword itself (e.g., locations of spectral peaks) with, e.g., existing audio data associated with the simple keyword model 316, but not account for, e.g., pitch, tone, timbre, and other voiceprint characteristics that help identify whose voice the keyword was spoken with, or which user uttered the keyword. In some embodiments, the simple keyword model 316 may be configured to determine the likelihood that a word or phoneme is present in the keyword based on MFCCs. Thus, given the input of the other keywords (e.g., 208, 214), the simple keyword model 316 may distinguish a false keyword from a true keyword that has been falsely rejected. The different (second) user keyword model discussed above may be an example of the simple keyword model 316.

In the case of FIG. 3, the audio data associated with the first keyword 208 may be determined to be a false keyword sample. That is, it does not match any aspect of the simple keyword model 316 associated with the keyword, which is indicative that the audio data does not correspond to a true keyword sample (correctly detected) or a falsely detected true keyword sample. Audio data associated with the second keyword 214 may be determined to be a falsely detected true keyword sample. That is, it matches some criteria associated with the simple keyword model. For example, at least a similarity threshold may have been met or exceeded.

The audio data associated with the first keyword 208 may be discarded, as it is not considered useful for training the user keyword model 212. However, the audio data associated with the second keyword 214 may be retained, stored, and/or transmitted elsewhere, as the audio data may be useful for training and improving the user keyword model 212.

In an alternative embodiment, keyword detection may be performed using one unified keyword model instead of two separate keyword models, i.e., using a single keyword model that includes at least portions of functionalities of user keyword model 212 and simple keyword model 316. In such an alternative embodiment, audio data for potential keywords may be evaluated with respect to the unified model rather than the user keyword model 212 or the simple keyword model 316. For example, audio data may be received by a detection model that is configured to implement the unified model. In some implementations, once the true keyword 216 is detected, the unified keyword model may receive the entire buffer 206 rather than only the sample for the true keyword 216 or only the rest of the buffer 206.

In one scenario, the unified model may determine that a given keyword sample (i) meets or exceeds similarity thresholds (e.g., first and second similarity thresholds discussed above) and/or (ii) matches audio characteristics to determine that the keyword sample is a true keyword sample, i.e., "similar enough" to cause or activate the desired functionality.

In another scenario, the unified model may determine that a given keyword sample (i) meets or exceeds a similarity threshold (e.g., only the first similarity threshold) and/or (ii) matches audio characteristics to determine that the keyword is a falsely rejected true keyword sample, i.e., not similar enough to cause or activate the desired functionality but similar enough to be used for further training the model.

In another scenario, the unified model may determine that a given keyword sample (i) meets or exceeds a similarity threshold (e.g., only the first similarity threshold) and/or (ii) does not match audio characteristics to determine that the keyword is a false sample. In another scenario, the unified model may determine that the given keyword sample (i) meets neither similarity threshold and/or (ii) does not match audio characteristics to determine that the keyword is a false sample.

Referring back to FIG. 3, in some embodiments, the UE 105 may include an upload module 318. In some embodiments, the upload module 318 may be configured to receive and transmit at least a portion of falsely rejected true keyword samples (e.g., 214) obtained from the keyword split module 314. The upload module 318 may include data interfaces configured to receive the audio data from other modules (e.g., keyword split module 314) and transmit the audio data to another device outside the UE 105 (e.g., a server, an external storage, another intermediary networked device). The data interfaces may be wired, wireline, or wireless (e.g., any of the wireless technologies described above). The upload module 318 may include or be associated with computer-readable instructions configured to be executed by one or more processor apparatus 304 to perform the above functions. In some implementations, the upload module 318 may include its own processor(s) to execute instructions.

In the case of FIG. 3, the upload module 318 may receive the falsely rejected true keyword sample associated with the second keyword 214. In contrast, upload module 318 may not receive the audio data associated with the false keyword sample associated with the first keyword 208, as it is not a true keyword that would be useful for further training. The upload module 318 may transmit the audio data associated with the falsely rejected true keyword sample to a server apparatus 320, which may be a direct transmission (e.g., wired or wireline) or via a network (e.g., wireless or otherwise). The transmission to the server apparatus 320 may occur periodically (e.g., every day at a predetermined time), in a batch after a number of falsely rejected true keyword samples has been collected, or manually by the user 202 or as determined by the UE 105.

In some embodiments, the server apparatus 320 may include a data storage module 322 and a training module 324. The data storage module 322 may be configured to receive falsely rejected true keyword samples (e.g., 214) from the UE 105 via the upload module 318. The upload module 318 may include data interfaces configured to receive audio data from another device (e.g., UE 105) and cause storage, among other things, the audio data. The receiving interface may be wired, wireline, or wireless (e.g., any of the wireless technologies described above). The data storage module 322 may include or be associated with computer-readable instructions configured to be executed by one or more processor apparatus (not shown) of the server apparatus 320 to perform the above functions. In some implementations, the data storage module 322 may include its own processor(s) to execute instructions.

In some implementations, the data storage module 322 may cause storage of at least a portion of the received audio data on another storage or memory associated with the server apparatus 320 (e.g., a separate storage on the server apparatus 320 or on another server, or an external storage device). The data storage module 322 may be configured to retrieve audio data from the other storage or memory when necessary.

As shown in FIG. 3, the data storage module 322 may receive and store falsely rejected true keyword samples. Storage may last for a definite period of time (e.g., 2 weeks) or indefinite period of time (e.g., until manually discarded or based on overflow). The stored samples may be associated with profiles of users who are subscribers of a network, part of a service linked to the UE, subscribers of a managed network operator (MNO) operating the server apparatus 320 and providing updates to the user keyword model, etc.

The training module 324 may be configured to retrieve one or more falsely rejected true keyword samples stored on or via the data storage module, and apply training algorithms to generate updated user keyword models. The training module 324 may include data interfaces configured to retrieve audio data from the data storage module 322. The receiving interface may be wired, wireline, or wireless (e.g., any of the wireless technologies described above). The training module 324 may include or be associated with computer-readable instructions configured to be executed by one or more processor apparatus (not shown) of the server apparatus 320 to perform the above functions. In some embodiments, the instructions may be configured to execute training algorithms. In some implementations, the training module 324 may include its own processor(s) to execute instructions.

In some embodiments, the training module 324 may be configured to use a training algorithm, e.g., a machine-learning algorithm, on the falsely rejected true keyword samples, in conjunction with a neural network (NN). A new, updated user keyword model 326 may be generated based on the training. That is, the user keyword model 212 generated on the UE may be not modified, but rather, replaced by the updated user keyword model 326. The training module 324 may subsequently further train the updated user keyword model 326 with additional samples to generate another updated user keyword model 326. In alternate embodiments, the user keyword model 212 may be uploaded to the server (e.g., via the upload module 318) as an initial user keyword model to be updated and replaced.

In some embodiments, a recurrent neural network (RNN) may be implemented, as it is particularly suited for voice recognition. Particularly, by including loops as part of the network, information from previous learning steps may persist, helping the network retain prior training data (e.g., initial and subsequent trainings) and ultimately allow more accurate recognition of true keywords. Training steps may implement at least forward propagation and backpropagation through the NN utilizing any suitable supervised, unsupervised, semi-supervised, and/or reinforced learning algorithms in conjunction with audio data samples retrievable from the data storage module 322. In some embodiments, at least classification algorithms as discussed above may be used, such as logistic regression, support vector machine (SVM), Naive Bayes, nearest neighbor (e.g., k-nearest neighbor (K-NN)), random forest, Gaussian Mixture Model (GMM), etc. At least a portion of the learning algorithm may also include non-classification algorithms such as linear regression.

According to different configurations, training of a user keyword model to generate an updated user keyword model 326 using the stored falsely rejected true keyword samples may occur periodically (e.g., every week at a predetermined time), when a sufficient number of falsely rejected true keyword samples have been obtained (e.g., 50 samples), or when manually requested by the user 202.

In certain embodiments, the server 320 may also receive at least a portion of audio data associated with the true keyword sample (associated with the third keyword 216), e.g., from the detection module 302. The true keyword sample may have a different amount of significance or relevance to updating the user keyword model (i.e., may not provide as much improvement to the model). However, true keyword samples may be used for confirming the validity of the model. For example, a true keyword sample may be used for inference or testing the updated model to ensure that providing the updated user keyword model to the UE 105 and that the updated model will still be functional if implemented by the detection module 302.

After the updated user keyword model 326 is generated, it may be transferred to the UE 105 via any data transmission interface utilizing, e.g., any of the wireless technologies described above, or wired or wireline means. Transmission of the updated user keyword model 326 may occur periodically (e.g., every day at a predetermined time), immediately after the updated user keyword model 326 has been generated, or manually via user request or as determined by the server apparatus 320. After receiving the updated user keyword model 326, the UE 105 may discard and replace the existing user keyword model 212 with the updated user keyword model 326, and implement the updated user keyword model 326 when evaluating potential keywords detected from the user 202.

Transmission of falsely rejected true keywords to may be advantageous, e.g., to offload computation-heavy activities such as using a training algorithm away from the UE and hence conserve power, memory, etc. In certain embodiments, however, transmission of the falsely rejected true keyword samples to may be optional. In other words, in certain embodiments, a training module (similar to training module 324) may reside on the UE 105, and the falsely rejected true keyword samples may be trained on the UE without transmitting the samples to another device such as the server 320. Such a configuration may be advantageous if, e.g., the UE is in an environment with limited or no network access, if immediate updates of the user keyword model 212 are desired, or if the user prefers to maintain data locally for privacy reasons.

Methods

Figure 4:
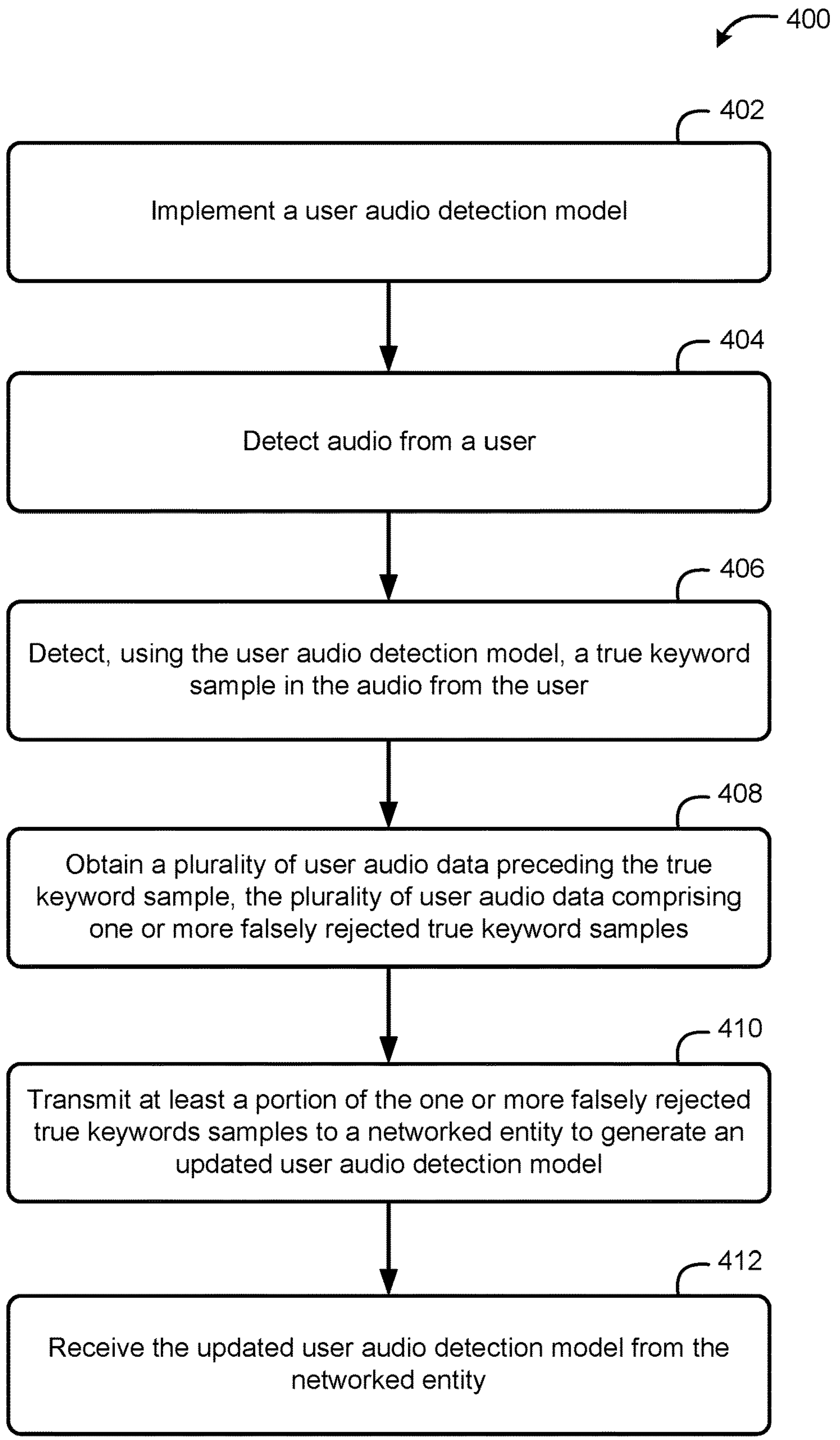
FIG. 4 is a flow diagram of a method of improving detection of voice-based keywords on a UE using falsely rejected data, according to an embodiment.
Figure 7:
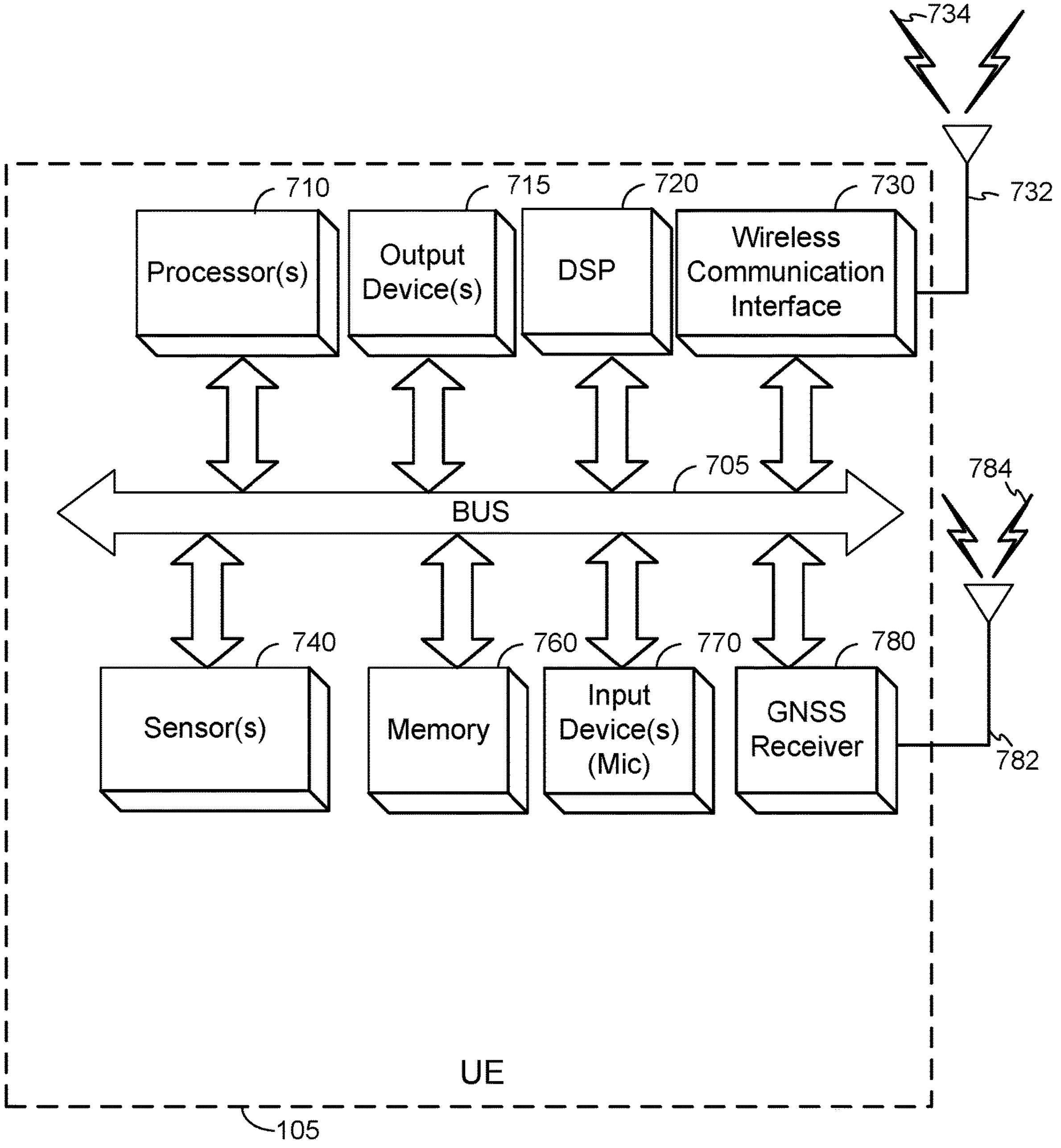
FIG. 7 is a block diagram of an embodiment of a UE, which can be utilized in embodiments as described herein.

FIG. 4 is a flow diagram of a method 400 of improving detection of voice-based keywords on a user equipment (UE) using falsely rejected data, according to an embodiment. Means for performing the functionality illustrated in one or more of the steps shown in FIG. 4 may include hardware and/or software components of a UE. Example components of a UE are illustrated in FIG. 7, which are described in more detail below. UE 105 discussed with respect to FIGS. 1-3 may be an example of the UE performing the steps below.

At step 402, the UE may implement an existing user audio detection model. The existing user audio detection model may be an example of the user keyword model 212. The existing user audio detection model may be based on one or more true keyword samples, e.g., initially trained by having a user vocalize and repeat the keyword multiple times.

A true keyword sample may be configured to, upon detection by the UE and evaluation by the existing user audio detection model indicating that a detected keyword sample matches one or more criteria imposed by the model, change an operational state of the UE based on true keyword samples detected subsequent to the training of the user audio detection model. In some embodiments, examples of change in operational state include initiating an assistant application, initiating a specific application, waking up from a lower power state, transitioning to a lower power state, toggling a power-saving mode, unlocking or locking the device, etc. In some embodiments, the change in operational state may generally include performance of one or more functionalities of the UE.

Means for performing step 402 may comprise a detection module (e.g., 302) and/or other components of the UE, as illustrated in FIGS. 3 and 7.

At step 404, the UE may detect audio from a user (e.g., 202). In some embodiments, the audio from the user includes one or more voice-based keywords uttered by the user. Multiple instances of the keyword may occur in the audio. The audio may include background noise and/or periods of silence.

Means for performing step 404 may comprise components of the UE (e.g., microphone), as illustrated in FIGS. 3 and 7.

At step 406, the UE may detect, using the existing user audio detection model, a true keyword sample in the audio from the user. In some embodiments, the true keyword may be determined to be a true keyword via evaluation against factors such as the voice profile of the user and/or based on a similarity of the detected audio data to the user keyword model.

The true keyword sample may be contained in an audio buffer (e.g., DSP buffer 206) maintained by the UE which continually records sounds detected by the UE, and the UE may detect the true keyword sample from the buffer. In some embodiments, the length of the buffer may be set to a predetermined length of time. In some embodiments, the length may be dynamically determined based on factors such as the characteristics of the detected audio, or other conditions such as other actions being performed by the UE. The buffer may also include background noise and other keyword samples, as discussed elsewhere herein.

Means for performing step 406 may comprise the DSP buffer (e.g., 206), the detection module (e.g., 302) and/or other components of the UE (e.g., microphone), as illustrated in FIGS. 3 and 7.

At step 408, the UE may obtain a plurality of user audio data preceding the true keyword sample. In some cases, the plurality of user audio data may include one or more rejected keywords, including one or more falsely rejected true keyword samples recorded in the aforementioned buffer. In some cases, the plurality of user audio data may include one or more falsely rejected true keyword samples as well as one or more false keyword samples recorded in the buffer. Whether the rejected keywords were actually false or falsely rejected may not yet be determined at this point, but the foregoing keyword samples are labeled as such to identify them in the present discussion. The plurality of user audio data may also include background noise and/or periods of silence in the buffer prior to the true keyword sample. However, the audio data for the keyword samples may be split or isolated from the background noise and periods of silence.

Means for performing step 408 may comprise the audio split module (e.g., 310) and/or other components of the UE (e.g., microphone), as illustrated in FIGS. 3 and 7.

At step 410, the UE may transmit at least a portion of the one or more falsely rejected true keyword samples to a networked entity to generate an updated user audio detection model. In some embodiments, the networked entity may be a "cloud" server apparatus (e.g., 320). In some embodiments, the one or more falsely rejected true keyword samples may be obtained by separating them from the one or more false keyword samples in the plurality of user audio data obtained in step 408, using a keyword split module (e.g., 314) which uses a simple keyword model to against which audio characteristics of the rejected keywords may be compared. False keyword samples are unlikely to be useful for improving the user keyword model, and falsely rejected true keyword samples are more likely to be useful as they are true keyword samples that should have but did not activate the desired functionality. Hence, false keyword samples may be discarded in some embodiments. In certain embodiments, the true keyword sample may be transmitted to the server as well.

Means for performing step 410 may comprise the upload module (e.g., 318) and/or other components of the UE, as illustrated in FIGS. 3 and 7.

At step 412, the UE may receive the updated user audio detection model from the networked entity, and implement it. In some embodiments, the UE replaces the existing audio detection model with the received updated user audio detection model. If the UE receives another updated user audio detection model, the existing user audio detection model may be replaced with the most recent updated user audio detection model.

In some embodiments, at least some of the received updated user audio detection model may be kept in storage (e.g., 306) as prior versions. If the currently implemented user audio detection model does not perform as expected (e.g., true keyword samples are being falsely detected more often than when the prior version of the user audio detection model is implemented), then a better-performing prior version may be selected.

Means for performing step 412 may comprise the one or more components of the UE (e.g., data interface), as illustrated in FIGS. 3 and 7.

Figure 5:
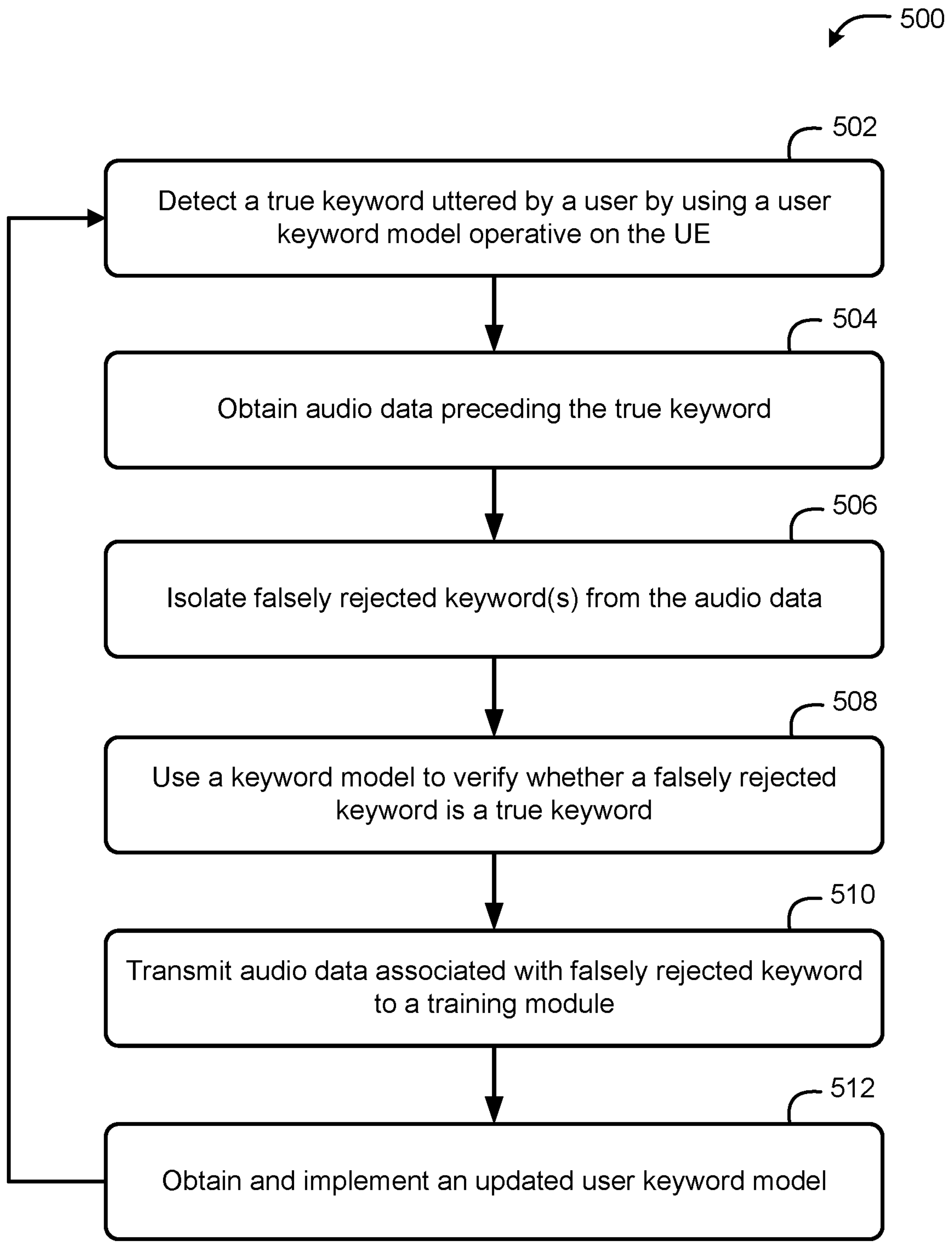
FIG. 5 is a flow diagram of a method of improving detection of voice-based keywords on a UE using falsely rejected data, according to another embodiment.

FIG. 5 is a flow diagram of a method 500 of improving detection of voice-based keywords on a user equipment (UE) using falsely rejected data, according to another embodiment. Means for performing the functionality illustrated in one or more of the steps shown in FIG. 5 may include hardware and/or software components of a UE. Example components of a UE are illustrated in FIG. 7, which are described in more detail below. UE 105 discussed with respect to FIGS. 1-3 may be an example of the UE performing the steps below.

At step 502, the UE may detect a true keyword uttered by a user by using a user keyword model operative on the UE. In some embodiments, the true keyword may be detected via UE equipment (e.g., microphone) and a detection module (e.g., 302). The true keyword may be determined to be a true keyword via evaluation against factors such as the voice profile of the user and/or based on a similarity of the detected audio data to the user keyword model.

At step 504, the UE may obtain audio data preceding the true keyword. In some embodiments, the UE maintains an audio buffer that continually records audio detected over a period of time, e.g., the last 10 seconds. Hence, when the UE detects the true keyword (step 502), the buffer contains audio preceding the audio data corresponding to the true keyword. The preceding audio data may contain audio data corresponding to falsely rejected true keyword samples and/or false keyword samples. Whether the rejected keywords were false or falsely rejected may not yet be determined at this point. In some embodiments, the audio data preceding the true keyword may be received by an audio split module (e.g., 310).

At step 506, the UE may isolate rejected keyword(s) from the audio data. In some embodiments, false keywords, background noise, and silence may be discarded. In some embodiments, the isolation may be performed by a keyword spit module (e.g., 314).

At step 508, the UE may use a keyword model to verify whether or not a rejected keyword is a true keyword. Such a determination may be made by comparing audio characteristics of the rejected keyword against a simple keyword model (e.g., 316) operative on the keyword split module. In some embodiments, the simple keyword model may only account for audio characteristics (based on, e.g., locations of spectral peaks, MFCCs) but not user characteristics (e.g., pitch, tone, timbre).

At step 510, upon determination that the rejected keyword is a falsely rejected true keyword, the UE may transmit audio data associated with the falsely rejected true keyword to a training module. In certain embodiments, audio data associated with the true keyword sample may be transmitted to the server as well. In some embodiments, the training module (e.g., 324) may be located at an external device, such as a "cloud" server (e.g., 320). The transmission of the audio data may be done via an upload module (e.g., 318) and/or data interfaces employed by the UE and the server.

At step 512, the UE may obtain and implement an updated user keyword model. In some embodiments, the updated user keyword model has been trained (or retrained) by the training module. In some embodiments, the detection module may implement the updated user keyword. An existing user keyword model at the detection module may be replaced by the updated user keyword model. In some embodiments, the prior user keyword model may be discarded. In some embodiments, the prior user keyword model may be stored at least temporarily. Stored prior versions may be useful, e.g., if an updated user keyword model does not perform as expected and a rollback is needed.

Figure 6:
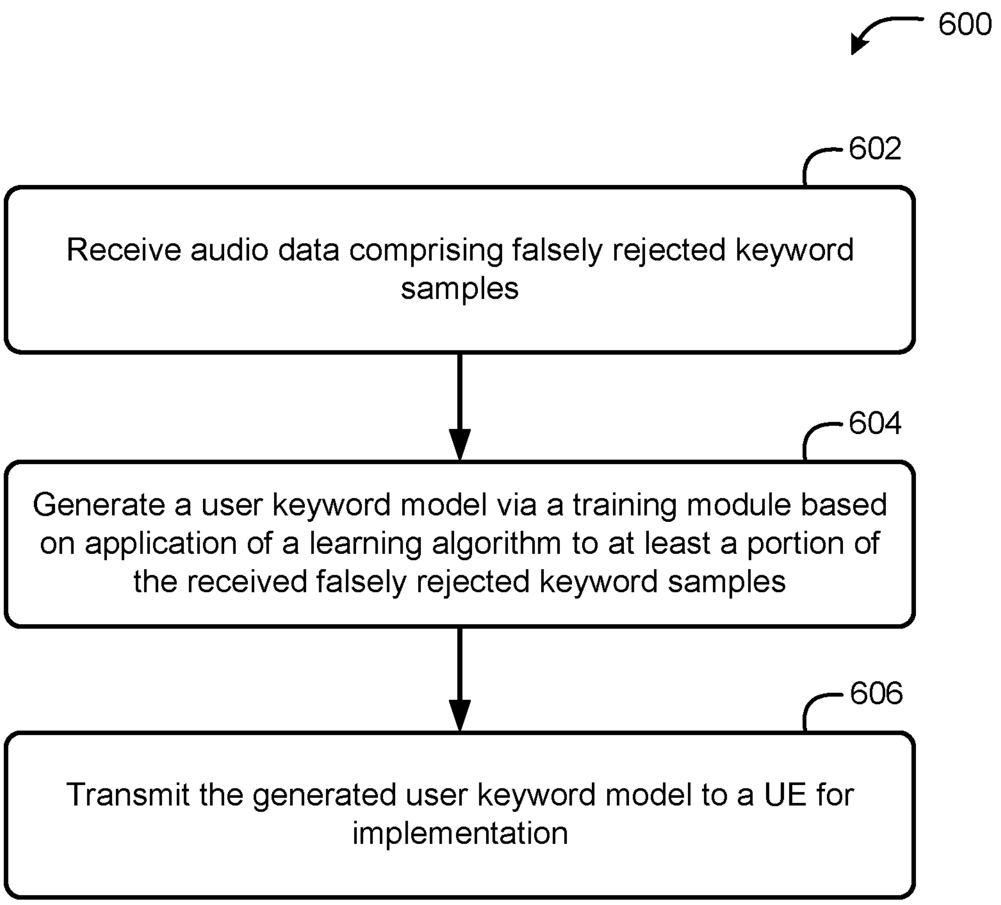
FIG. 6 is a flow diagram of a method of training a model for detection of voice-based keywords using falsely rejected data, according to one embodiment.
Figure 8:
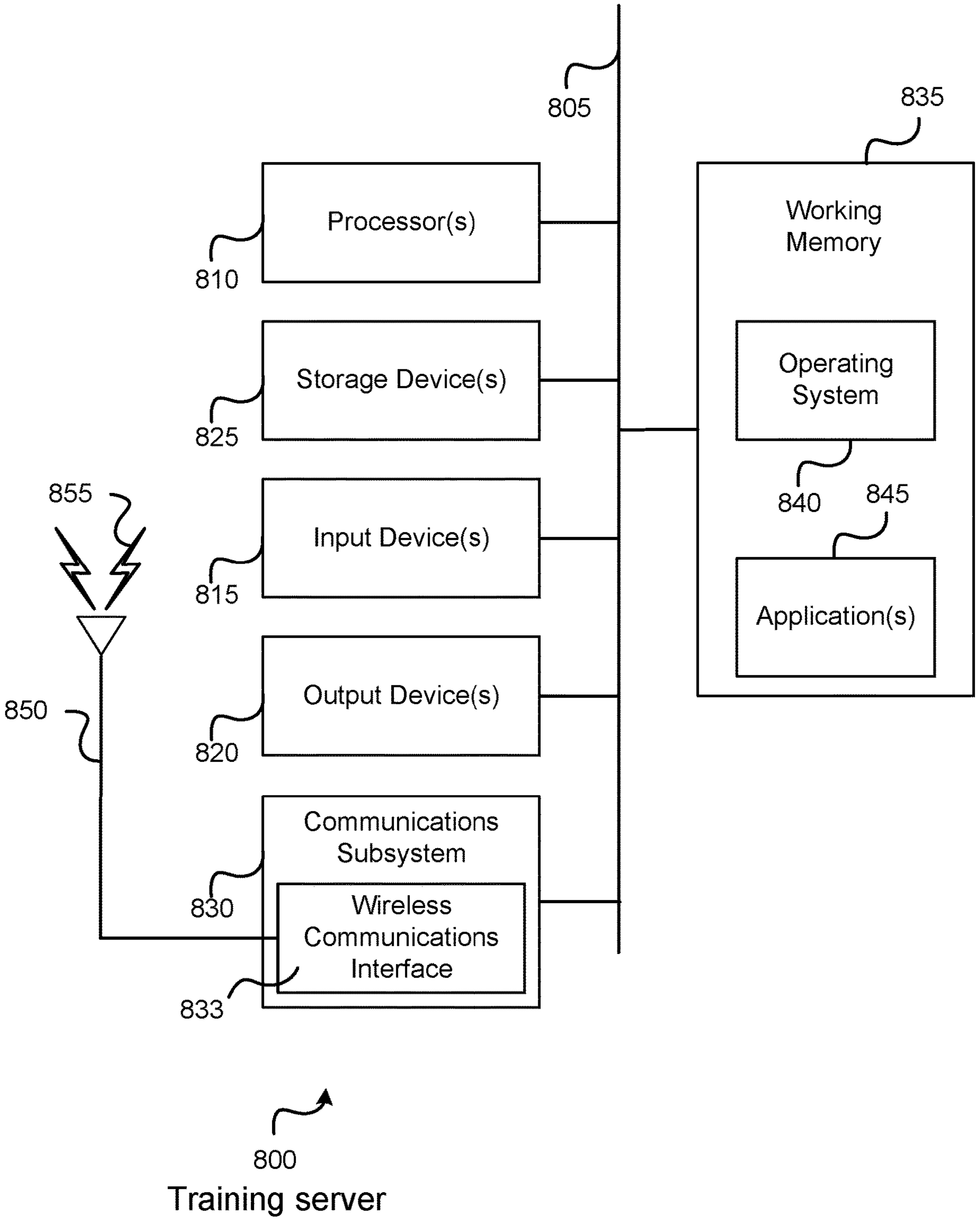
FIG. 8 is a block diagram of an embodiment of a computer system, which can be utilized in embodiments as described herein.

FIG. 6 is a flow diagram of a method 600 of training a model for detection of voice-based keywords using falsely rejected data, according to one embodiment. Means for performing the functionality illustrated in one or more of the steps shown in FIG. 6 may include hardware and/or software components of a server apparatus. Example components of a server are illustrated in FIG. 8, which are described in more detail below. Server 320 discussed with respect to FIG. 3 may be an example of the server performing the steps below.

At step 602, the server may receive audio data comprising falsely rejected keyword samples. In some embodiments, the audio data may be received from a UE (e.g., 105) and stored at a data storage module (e.g., 322). In some embodiments, at least a portion of the audio data may be received from another device other than the UE, e.g., an external storage, a networked device (e.g., another server), another UE associated with a user of the UE 105. The server may be "on the cloud" and receive the audio data using any type of data interface, e.g., wired, wireline, or wireless (e.g., any of the wireless technologies described above.

At step 604, the server may generate a user keyword model (e.g., 326) via a training module (e.g., 324) based on application of a learning algorithm to at least a portion of the received falsely rejected keyword samples. In some embodiments, the generated user keyword model is a new model rather than a modification of an existing model (e.g., existing user keyword model (e.g., 212) operative on the UE). The generated user keyword model may be configured to be implemented by the UE, e.g., at a detection module (e.g., 302). Specifically, the existing version of the user keyword model on the UE may be replaced by the newly generated user keyword model. However, in one alternative embodiment, the existing user keyword model on the UE is received and modified by the training module, rather than newly generated.

In various embodiments, any one or more of the aforementioned classification algorithms may be used, e.g., logistic regression, support vector machine (SVM), Naive Bayes, nearest neighbor (e.g., k-nearest neighbor (K-NN)), random forest, Gaussian Mixture Model (GMM). At least a portion of the learning algorithm may also include non-classification algorithms such as linear regression.

At step 606, the server may transmit the generated user keyword model to the UE for implementation. Transmission may occur using any of the data interfaces mentioned above.

Apparatus

FIG. 7 illustrates an embodiment of a UE 105, which can be utilized as described herein above (e.g., in association with FIGS. 1-5). For example, the UE 105 can perform one or more of the functions of the method shown in FIGS. 3 and 4. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 7.

The UE 105 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below). The UE 105 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The UE 105 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named “3rd Generation Partnership Project X3” (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensors 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term “GNSS receiver” may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 710, DSP 720, and/or a processing unit within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 710 or DSP 720.

The UE 105 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processing unit(s) 710 or DSP 720 within UE 105). In an aspect, then such code and/or instructions can be used to configure and/or adapt a general-purpose computer (or other device) to perform one or more operations in accordance with the described methods.

FIG. 8 is a block diagram of an embodiment of a computer system 800, which may be used, in whole or in part, to provide the functions of one or more network components as described in the embodiments herein (e.g., server apparatus 320 of FIG. 3). It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processing unit(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communications subsystem 830, which may comprise wireless communication technologies managed and controlled by a wireless communication interface 833, as well as wired technologies (such as Ethernet, coaxial communications, universal serial bus (USB), and the like). The wireless communication interface 833 may send and receive wireless signals 855 (e.g., signals according to 5G NR or LTE) via wireless antenna(s) 850. Thus the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a User Equipment (UE), base stations and/or other TRPs, and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Such computer programs may be embodied in hardware and/or software implementations of data storage module 322 and training module 324. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an “RF signal” comprises an electromagnetic wave that transports information through the space between a transmitter (or transmitting device) and a receiver (or receiving device). As used herein, a transmitter may transmit a single “RF signal” or multiple “RF signals” to a receiver. However, the receiver may receive multiple “RF signals" corresponding to each transmitted RF signal due to the propagation characteristics of RF signals through multipath channels. The same transmitted RF signal on different paths between the transmitter and receiver may be referred to as a "multipath" RF signal.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of updating a user audio detection model on a user equipment, the method comprising: implementing the user audio detection model, the user audio detection model configured to change an operational state of the user equipment based on true keyword samples detected; detecting audio from a user; detecting, using the user audio detection model, presence of a true keyword sample in the audio from the user; responsive to the detecting of the audio from the user, obtaining a plurality of user audio data preceding the true keyword sample, the plurality of user audio data comprising one or more falsely rejected true keyword samples, the one or more falsely rejected true keyword samples being insufficient to change the operational state of the user equipment; transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and receiving the updated user audio detection model from the networked entity, or locally generating the updated user audio detection model using the at least portion of the one or more falsely rejected true keyword samples.

Clause 2: The method of clause 1, wherein: the plurality of user audio data further comprises one or more false keyword samples; and the method further comprises separating the one or more falsely rejected true keyword samples from the one or more false keyword samples prior to the transmitting of the at least portion of the one or more falsely rejected true keyword samples to the networked entity.

Clause 3: The method of any of clauses 1-2 further comprising discarding the one or more false keyword samples.

Clause 4: The method of any of clauses 1-3 further comprising transmitting the user audio detection model to the networked entity prior to the transmitting of the at least portion of the one or more falsely rejected true keyword samples to the networked entity, the networked entity comprising a server apparatus.

Clause 5: The method of any of clauses 1-4 further comprising determining a presence of the one or more falsely rejected keyword true samples in the plurality of user audio data based on a first similarity threshold associated with the user audio detection model being met or exceeded but not meeting or exceeding a second similarity threshold.

Clause 6: The method of any of clauses 1-5 further comprising determining a presence of the one or more falsely rejected keyword true samples in the plurality of user audio data based on another user audio detection model, the another user audio detection model comprising at least a different detection criterion from the user audio detection model.

Clause 7: The method of any of clauses 1-6 further comprising replacing the user audio detection model with the received updated user audio detection model.

Clause 8: The method of any of clauses 1-7 further comprising detecting one or more second falsely rejected true samples subsequent to the receiving of the updated user audio detection model; transmitting at least a portion of the one or more second falsely rejected true samples to the networked entity, the at least portion of the one or more second falsely rejected true samples configured to be used in generation of a second updated user audio detection model; receiving the second updated user audio detection model from the networked entity; and replacing the updated user audio detection model with the second updated user audio detection model.

Clause 9: The method of any of clauses 1-8 further comprising detecting one or more subsequent true samples, and transmitting at least a portion of the one or more subsequent true samples to the networked entity, the at least portion of the one or more subsequent true samples configured to be used in the generation of the updated user audio detection model.

Clause 10: The method of any of clauses 1-9 further comprising training the user audio detection model based on one or more true keyword samples, wherein the one or more true keyword samples and the plurality of user audio data comprise audio data associated with voice of the user.

Clause 11: The method of any of clauses 1-10 further comprising maintaining an audio buffer, and temporarily storing the audio from the user in the audio buffer for a prescribed length, the audio buffer comprising the true keyword sample and the one or more falsely rejected true keyword samples.

Clause 12: User equipment capable of improving a user audio detection model, the user equipment comprising: a memory; and a processor, coupled to the memory, and operably configured to: implement the user audio detection model, the user audio detection model configured to change an operational state of the user equipment based on true keyword samples detected; detect audio from a user; detect, using the user audio detection model, presence of a true keyword sample in the audio from the user; responsive to the detecting of the audio from the user, obtain a plurality of user audio data preceding the true keyword sample, the plurality of user audio data comprising one or more falsely rejected true keyword samples, the one or more falsely rejected true keyword samples being insufficient to change the operational state of the user equipment; transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

Clause 13: The user equipment of clause 12, wherein: the plurality of user audio data further comprises one or more false keyword samples; and the plurality of instructions are further configured to, when executed by the processor apparatus, cause the user equipment to separate the one or more falsely rejected true keyword samples from the one or more false keyword samples prior to the transmitting of the at least portion of the one or more falsely rejected true keyword samples to the networked entity.

Clause 14: The user equipment of any of clauses 12-13 wherein the plurality of instructions are further configured to, when executed by the processor apparatus, cause the user equipment to discard the one or more false keyword samples.

Clause 15: The user equipment of any of clauses 12-14 wherein the plurality of instructions are further configured to, when executed by the processor apparatus, cause the user equipment to transmit the user audio detection model to the networked entity prior to the transmitting of the at least portion of the one or more falsely rejected true keyword samples to the networked entity, the networked entity comprising a server apparatus.

Clause 16: The user equipment of any of clauses 12-15 wherein the plurality of instructions are further configured to, when executed by the processor apparatus, cause the user equipment to determine a presence of the one or more falsely rejected true keyword samples in the plurality of user audio data based on a first similarity threshold associated with the user audio detection model being met or exceeded but not meeting or exceeding a second similarity threshold.

Clause 17: The user equipment of any of clauses 12-16 wherein the plurality of instructions are further configured to, when executed by the processor apparatus, cause the user equipment to determine a presence of the one or more falsely rejected true keyword samples in the plurality of user audio data based on another user audio detection model, the another user audio detection model comprising at least a different detection criterion from the user audio detection model.

Clause 18: The user equipment of any of clauses 12-17 wherein the plurality of instructions are further configured to, when executed by the processor apparatus, cause the user equipment to replace the user audio detection model with the received updated user audio detection model.

Clause 19: The user equipment of any of clauses 12-18 wherein the plurality of instructions are further configured to, when executed by the processor apparatus, cause the user equipment to detect one or more subsequent true samples, and transmit at least a portion of the one or more subsequent true samples to the networked entity, the at least portion of the one or more subsequent true samples configured to be used in the generation of the updated user audio detection model.

Clause 20: The user equipment of any of clauses 12-19 wherein the plurality of instructions are further configured to, when executed by the processor apparatus, cause the user equipment to train the user audio detection model based on one or more true keyword samples, wherein the one or more true keyword samples and the plurality of user audio data comprise audio data associated with voice of the user.

Clause 21: The user equipment of any of clauses 12-20 wherein the plurality of instructions are further configured to, when executed by the processor apparatus, cause the user equipment to maintain an audio buffer, and temporarily store the audio from the user in the audio buffer for a prescribed length, the audio buffer comprising the true keyword sample and the one or more falsely rejected true keyword samples.

Clause 22: A non-transitory computer-readable apparatus comprising a storage medium, the storage medium comprising a plurality of instructions configured to, when executed by one or more processors, cause user equipment to: implement a user audio detection model, the user audio detection model configured to change an operational state of the user equipment based on true keyword samples detected; detect audio from a user; detect, using the user audio detection model, presence of a true keyword sample in the audio from the user; responsive to the detecting of the audio from the user, obtain a plurality of user audio data preceding the true keyword sample, the plurality of user audio data comprising one or more falsely rejected true keyword samples, the one or more falsely rejected true keyword samples being insufficient to change the operational state of the user equipment; transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

Clause 23: The non-transitory computer-readable apparatus of clause 22, wherein the plurality of instructions are further configured to, when executed by the one or more processors, cause the user equipment to maintain an audio buffer, and temporarily store audio data associated with voice of the user in the audio buffer for a prescribed length, the audio buffer comprising the true keyword sample and the one or more falsely rejected true keyword samples.

Clause 24: The non-transitory computer-readable apparatus of any of clauses 22-23 wherein the plurality of user audio data further comprises one or more false keyword samples; and the plurality of instructions are further configured to, when executed by the one or more processors, cause the user equipment to separate the one or more falsely rejected true keyword samples from the one or more false keyword samples prior to the transmitting of the at least portion of the one or more falsely rejected true keyword samples to the networked entity.

Clause 25: The non-transitory computer-readable apparatus of any of clauses 22-24 wherein the plurality of instructions are further configured to, when executed by the processor apparatus, cause the user equipment to determine a presence of the one or more falsely rejected true keyword samples in the plurality of user audio data based on a first similarity threshold associated with the user audio detection model being met or exceeded but not meeting or exceeding a second similarity threshold.

Clause 26: The non-transitory computer-readable apparatus of any of clauses 22-25 wherein the plurality of instructions are further configured to, when executed by the processor apparatus, cause the user equipment to replace the user audio detection model with the received updated user audio detection model.

Clause 27: User equipment comprising: means for implementing a user audio detection model, the user audio detection model configured to change an operational state of the user equipment based on true keyword samples detected; means for detecting audio from a user; means for detecting, using the user audio detection model, presence of a true keyword sample in the audio from the user; means for, responsive to the detecting of the audio from the user, obtaining a plurality of user audio data preceding the true keyword sample, the plurality of user audio data comprising one or more falsely rejected true keyword samples, the one or more falsely rejected true keyword samples being insufficient to change the operational state of the user equipment; means for transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and means for receiving the updated user audio detection model from the networked entity, or locally generating the updated user audio detection model using the at least portion of the one or more falsely rejected true keyword samples.

Clause 28: The user equipment of clause 27, wherein: the plurality of user audio data further comprises one or more false keyword samples; and the user equipment further comprises means for separating the one or more falsely rejected true keyword samples from the one or more false keyword samples prior to the transmitting of the at least portion of the one or more falsely rejected true keyword samples to the networked entity.

Clause 29: The user equipment of any of clauses 27-28 further comprising means for determining a presence of the one or more falsely rejected keyword true samples in the plurality of user audio data based on a first similarity threshold associated with the user audio detection model being met or exceeded but not meeting or exceeding a second similarity threshold.

Clause 30: The user equipment of any of clauses 27-29 wherein the one or more true keyword samples and the plurality of user audio data comprise audio data associated with voice of the user; and the user equipment further comprises means for maintaining an audio buffer, and temporarily storing the audio data associated with voice of the user in the audio buffer for a prescribed length, the audio buffer comprising the true keyword sample and the one or more falsely rejected true keyword samples.

What is claimed is:

1. A method of updating a user audio detection model on a user equipment, the method comprising:

implementing the user audio detection model, the user audio detection model configured to change an operational state of the user equipment based on true keyword samples detected;

detecting audio from a user;

detecting, using the user audio detection model, a presence of a true keyword sample in the audio from the user;

responsive to the detecting, using the user audio detection model, the presence of the true keyword sample in the audio from the user, obtaining, from an audio buffer, a plurality of user audio data preceding the true keyword sample, the plurality of user audio data comprising one or more falsely rejected true keyword samples, the one or more falsely rejected true keyword samples being insufficient to change the operational state of the user equipment;

after the obtaining of the plurality of user audio data from the audio buffer, filtering the plurality of user audio data obtained from the audio buffer to isolate one or more keyword samples from at least one of background noise or periods of silence in the plurality of user audio data, the one or more keyword samples including the one or more falsely rejected true keyword samples;

after the filtering, determining a presence of the one or more falsely rejected true keyword samples among the one or more keyword samples based on a keyword model that is different from the user audio detection model and that comprises at least a different detection criterion from the user audio detection model;

transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and receiving the updated user audio detection model from the networked entity, or locally generating the updated user audio detection model using the at least portion of the one or more falsely rejected true keyword samples.

2. The method of claim 1, wherein:

the plurality of user audio data further comprises one or more false keyword samples; and the method further comprises separating the one or more falsely rejected true keyword samples from the one or more false keyword samples prior to the transmitting of the at least portion of the one or more falsely rejected true keyword samples to the networked entity.

3. The method of claim 2, further comprising discarding the one or more false keyword samples.

4. The method of claim 1, further comprising transmitting the user audio detection model to the networked entity prior to the transmitting of the at least portion of the one or more falsely rejected true keyword samples to the networked entity, the networked entity comprising a server apparatus.

5. The method of claim 1, further comprising determining a presence of the one or more falsely rejected true keyword samples in the plurality of user audio data based on a first similarity threshold associated with the user audio detection model being met or exceeded but not meeting or exceeding a second similarity threshold.

6. The method of claim 1, further comprising determining a presence of the one or more falsely rejected true keyword samples in the plurality of user audio data based on another user audio detection model, the another user audio detection model comprising at least a different detection criterion from the user audio detection model.

7. The method of claim 1, further comprising replacing the user audio detection model with the received updated user audio detection model.

8. The method of claim 1, further comprising:

detecting one or more second falsely rejected true samples subsequent to the receiving of the updated user audio detection model;

transmitting at least a portion of the one or more second falsely rejected true samples to the networked entity, the at least portion of the one or more second falsely rejected true samples configured to be used in generation of a second updated user audio detection model;

receiving the second updated user audio detection model from the networked entity; and replacing the updated user audio detection model with the second updated user audio detection model.

9. The method of claim 1, further comprising detecting one or more subsequent true samples, and transmitting at least a portion of the one or more subsequent true samples to the networked entity, the at least portion of the one or more subsequent true samples configured to be used in the generation of the updated user audio detection model.

10. The method of claim 1, further comprising training the user audio detection model based on one or more true keyword samples, wherein the one or more true keyword samples and the plurality of user audio data comprise audio data associated with a voice of the user.

11. The method of claim 1, further comprising temporarily storing the audio from the user in the audio buffer for a prescribed length, the audio buffer comprising the true keyword sample and the one or more falsely rejected true keyword samples.

12. User equipment capable of improving a user audio detection model, the user equipment comprising:

a memory; and a processor, coupled to the memory, and operably configured to:

implement the user audio detection model, the user audio detection model configured to change an operational state of the user equipment based on true keyword samples detected;

detect audio from a user;

detect, using the user audio detection model, a presence of a true keyword sample in the audio from the user;

responsive to the detecting, using the user audio detection model, the presence of the true keyword sample in the audio from the user, obtain, from an audio buffer, a plurality of user audio data preceding the true keyword sample, the plurality of user audio data comprising one or more falsely rejected true keyword samples, the one or more falsely rejected true keyword samples being insufficient to change the operational state of the user equipment;

after the obtaining of the plurality of user audio data from the audio buffer, filter the plurality of user audio data obtained from the audio buffer to isolate one or more keyword samples from at least one of background noise or periods of silence in the plurality of user audio data, the one or more keyword samples including the one or more falsely rejected true keyword samples;

after the filtering, determine a presence of the one or more falsely rejected true keyword samples among the one or more keyword samples based on a keyword model that is different from the user audio detection model and that comprises at least a different detection criterion from the user audio detection model;

transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

13. The user equipment of claim 12, wherein:

the plurality of user audio data further comprises one or more false keyword samples; and the processor is further configured to separate the one or more falsely rejected true keyword samples from the one or more false keyword samples prior to the transmitting of the at least portion of the one or more falsely rejected true keyword samples to the networked entity.

14. The user equipment of claim 13, wherein the processor is further configured to discard the one or more false keyword samples.

15. The user equipment of claim 12, wherein the processor is further configured to transmit the user audio detection model to the networked entity prior to the transmitting of the at least portion of the one or more falsely rejected true keyword samples to the networked entity, the networked entity comprising a server apparatus.

16. The user equipment of claim 12, wherein the processor is further configured to determine a presence of the one or more falsely rejected true keyword samples in the plurality of user audio data based on a first similarity threshold associated with the user audio detection model being met or exceeded but not meeting or exceeding a second similarity threshold.

17. The user equipment of claim 12, wherein the processor is further configured to determine a presence of the one or more falsely rejected true keyword samples in the plurality of user audio data based on another user audio detection model, the another user audio detection model comprising at least a different detection criterion from the user audio detection model.

18. The user equipment of claim 12, wherein the processor is further configured to replace the user audio detection model with the received updated user audio detection model.

19. The user equipment of claim 12, wherein the processor is further configured to detect one or more subsequent true samples, and transmit at least a portion of the one or more subsequent true samples to the networked entity, the at least portion of the one or more subsequent true samples configured to be used in the generation of the updated user audio detection model.

20. The user equipment of claim 12, wherein the processor is further configured to train the user audio detection model based on one or more true keyword samples, wherein the one or more true keyword samples and the plurality of user audio data comprise audio data associated with a voice of the user.

21. The user equipment of claim 12, wherein the processor is further configured to temporarily store the audio from the user in the audio buffer for a prescribed length, the audio buffer comprising the true keyword sample and the one or more falsely rejected true keyword samples.

22. A non-transitory computer-readable storage medium comprising a plurality of instructions configured to, when executed by one or more processors, cause user equipment to:

implement a user audio detection model, the user audio detection model configured to change an operational state of the user equipment based on true keyword samples detected;

detect audio from a user;

detect, using the user audio detection model, a presence of a true keyword sample in the audio from the user;

responsive to the detecting, using the user audio detection model, the presence of the true keyword sample in the audio from the user, obtain, from an audio buffer, a plurality of user audio data preceding the true keyword sample, the plurality of user audio data comprising one or more falsely rejected true keyword samples, the one or more falsely rejected true keyword samples being insufficient to change the operational state of the user equipment;

after the obtaining of the plurality of user audio data from the audio buffer, filter the plurality of user audio data obtained from the audio buffer to isolate one or more keyword samples from at least one of background noise or periods of silence in the plurality of user audio data, the one or more keyword samples including the one or more falsely rejected true keyword samples;

after the filtering, determine a presence of the one or more falsely rejected true keyword samples among the one or more keyword samples based on a keyword model that is different from the user audio detection model and that comprises at least a different detection criterion from the user audio detection model;

transmit at least a portion of the one or more falsely rejected true keyword samples to a networked entity, or access the at least portion of the one or more falsely rejected true keyword samples locally at the user equipment, the at least portion of the one or more falsely rejected true keyword samples configured to be used in generation of an updated user audio detection model; and receive the updated user audio detection model from the networked entity, or locally generate the updated user audio detection model using the at least portion of the one or more falsely rejected true keyword samples.

23. The non-transitory computer-readable storage medium of claim 22, wherein the plurality of instructions are further configured to, when executed by the one or more processors, cause the user equipment to maintain an audio buffer, and temporarily store audio data associated with a voice of the user in the audio buffer for a prescribed length, the audio buffer comprising the true keyword sample and the one or more falsely rejected true keyword samples.

24. The non-transitory computer-readable storage medium of claim 22, wherein:

the plurality of user audio data further comprises one or more false keyword samples; and the plurality of instructions are further configured to, when executed by the one or more processors, cause the user equipment to separate the one or more falsely rejected true keyword samples from the one or more false keyword samples prior to the transmitting of the at least portion of the one or more falsely rejected true keyword samples to the networked entity.

25. The non-transitory computer-readable storage medium of claim 22, wherein the plurality of instructions are further configured to, when executed by the one or more processors, cause the user equipment to determine a presence of the one or more falsely rejected true keyword samples in the plurality of user audio data based on a first similarity threshold associated with the user audio detection model being met or exceeded but not meeting or exceeding a second similarity threshold.

26. The non-transitory computer-readable storage medium of claim 22, wherein the plurality of instructions are further configured to, when executed by the one or more processors, cause the user equipment to replace the user audio detection model with the received updated user audio detection model.

27. User equipment comprising:

means for implementing a user audio detection model, the user audio detection model configured to change an operational state of the user equipment based on true keyword samples detected;

means for detecting audio from a user;

means for detecting, using the user audio detection model, a presence of a true keyword sample in the audio from the user;

means for obtaining, responsive to the detecting, using the user audio detection model, the presence of the true keyword sample in the audio from the user, a plurality of user audio data preceding the true keyword sample from an audio buffer, the plurality of user audio data comprising one or more falsely rejected true keyword samples, the one or more falsely rejected true keyword samples being insufficient to change the operational state of the user equipment;

means for filtering, after the obtaining of the plurality of user audio data from the audio buffer, the plurality of user audio data obtained from the audio buffer to isolate one or more keyword samples from at least one of background noise or periods of silence in the plurality of user audio data, the one or more keyword samples including the one or more falsely rejected true keyword samples;

means for determining, after the filtering, a presence of the one or more falsely rejected true keyword samples among the one or more keyword samples based on a keyword model that is different from the user audio detection model and that comprises at least a different detection criterion from the user audio detection model;

means for transmitting at least a portion of the one or more falsely rejected true keyword samples to a networked entity, or accessing the at least portion of the one or more falsely rejected true keyword samples locally at the user equipment, the at least portion of the one or more falsely rejected true keyword samples configured to be used in generation of an updated user audio detection model; and means for receiving the updated user audio detection model from the networked entity, or locally generating the updated user audio detection model using the at least portion of the one or more falsely rejected true keyword samples.

28. The user equipment of claim 27, wherein:

the plurality of user audio data further comprises one or more false keyword samples; and the user equipment further comprises means for separating the one or more falsely rejected true keyword samples from the one or more false keyword samples prior to the transmitting of the at least portion of the one or more falsely rejected true keyword samples to the networked entity.

29. The user equipment of claim 27, further comprising means for determining a presence of the one or more falsely rejected true keyword samples in the plurality of user audio data based on a first similarity threshold associated with the user audio detection model being met or exceeded but not meeting or exceeding a second similarity threshold.

30. The user equipment of claim 27, wherein:

the one or more true keyword samples and the plurality of user audio data comprise audio data associated with a voice of the user; and the user equipment further comprises means for temporarily storing the audio data associated with the voice of the user in the audio buffer for a prescribed length, the audio buffer comprising the true keyword sample and the one or more falsely rejected true keyword samples.

* * * * *